(12) United States Patent
Solan et al.

(10) Patent No.: US 12,265,721 B2
(45) Date of Patent: *Apr. 1, 2025

(54) FAST RECOVERY IN RECOVERPOINT USING DIRECT STORAGE ACCESS

(71) Applicant: EMC IP HOLDING COMPANY LLC, Hopkinton, MA (US)

(72) Inventors: Alex Solan, Hertzelia (IL); Jehuda Shemer, Kfar Saba (IL); Gabi Benhanokh, Tel-Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/539,630

(22) Filed: Dec. 1, 2021

(65) Prior Publication Data

US 2022/0091747 A1 Mar. 24, 2022

Related U.S. Application Data

(63) Continuation of application No. 16/834,022, filed on Mar. 30, 2020, now Pat. No. 11,221,786.

(51) Int. Cl.
*G06F 3/06* (2006.01)
(52) U.S. Cl.
CPC ............ *G06F 3/065* (2013.01); *G06F 3/0619* (2013.01); *G06F 3/0635* (2013.01); *G06F 3/067* (2013.01)
(58) Field of Classification Search
None
See application file for complete search history.

(56) References Cited

U.S. PATENT DOCUMENTS

| | | | |
|---|---|---|---|
| 8,099,624 B1 | 1/2012 | Saxena et al. | |
| 9,075,719 B2 | 7/2015 | Teranishi et al. | |
| 9,524,243 B1* | 12/2016 | Kornfeld | G06F 11/3034 |
| 10,037,369 B1 | 7/2018 | Bono et al. | |
| 2006/0259680 A1* | 11/2006 | Chandrasekaran | G06F 3/0665 711/6 |
| 2007/0005881 A1 | 1/2007 | Garney | |
| 2008/0005507 A1* | 1/2008 | Madnani | G06F 3/0607 711/161 |
| 2008/0147934 A1* | 6/2008 | Nonaka | G06F 3/067 710/74 |
| 2011/0004732 A1 | 1/2011 | Krakirian et al. | |
| 2014/0019667 A1* | 1/2014 | Shimada | G06F 3/0605 710/316 |

(Continued)

OTHER PUBLICATIONS

Windows Offloaded Data Transfers Overview, Aug. 31, 2016, https://learn.microsoft.com/en-us/previous-versions/windows/it-pro/windows-server-2012-r2-and-2012/hh831628(v=ws.11) (Year: 2016).*

*Primary Examiner* — Arpan P. Savla
*Assistant Examiner* — Edmund H Kwong
(74) *Attorney, Agent, or Firm* — Workman Nydegger

(57) ABSTRACT

Data protection operations based on direct storage access. Data protection operations that involve large data transfers are optimized or improved by transferring the data using a communication path that includes direct access to disks of a storage array. This avoids latencies associated with transferring data through the layers of the storage array. The locations of the data to be transferred are identified and provided to an appliance. The appliance can then read and transfer the data over a communication path that includes direct disk access.

12 Claims, 4 Drawing Sheets

(56) References Cited

U.S. PATENT DOCUMENTS

| | | | |
|---|---|---|---|
| 2015/0074458 A1 | 3/2015 | Atluri et al. | |
| 2016/0299709 A1 | 10/2016 | Somers et al. | |
| 2016/0344810 A1* | 11/2016 | Das | G06F 3/0617 |
| 2017/0228388 A1* | 8/2017 | Venkat | G06F 3/067 |
| 2019/0042520 A1 | 2/2019 | Velez et al. | |
| 2020/0019316 A1* | 1/2020 | Barzik | G06F 3/0658 |
| 2020/0133530 A1 | 4/2020 | Tylik et al. | |

\* cited by examiner

FAST RECOVERY IN RECOVERPOINT USING DIRECT STORAGE ACCESS

FIELD OF THE INVENTION

Embodiments of the present invention generally relate to data protection operations. More particularly, at least some embodiments of the invention relate to systems, hardware, software, computer-readable media, and methods for performing data protection operations including data transfer operations and recovery operations.

BACKGROUND

Data protection operations are generally understood to include the ability to perform backup operations and, if necessary, perform recovery operations. The type of recovery operation that needs to be performed, however, can vary. Sometimes it may only be necessary to recover a single file or object. At the other end of the spectrum, a recovery operation may require the recovery of all data. Understandably, the problem of recovering a single object or file is a very different problem compared to recovering from a situation that is more disastrous.

In a scenario where there is a total failure of the production site or data or a situation where the backup site has completely failed, it may be necessary to send the entire contents of a source disk or array to a target disk or array. Transferring the entire contents of a source to a target can require a significant amount of time. Often, the process can consume days.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for performing data protection operations. Examples of data operations include recovery operations, data transfer operations, backup operations, replication operations, deduplication operations, disaster recovery operations, failover operations, and the like or combination thereof.

In general, example embodiments of the inventions relate to various data protection operations including recovery operations, synchronization operations, backup operations, and data transfer operations. Embodiments of the invention relate to recovery operations that involve large amounts of data (e.g., an entire disk or array or multiple arrays). However, embodiments of the invention are not limited to large data transfers and may be applied to smaller data transfers.

Figure 1A:
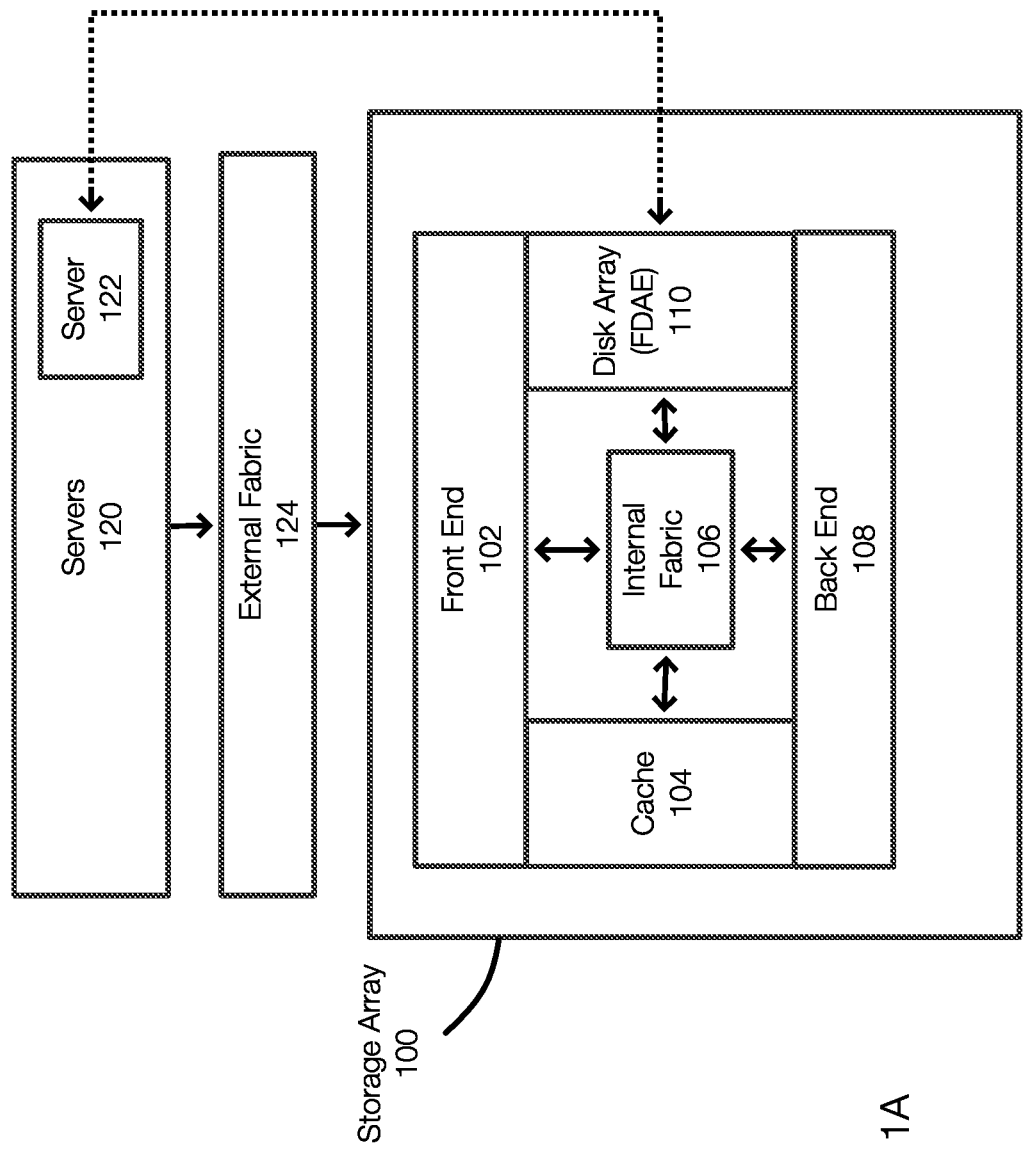
FIG. 1A discloses aspects of a storage array that allows for direct disk access over a second communication path.

FIG. 1A illustrates an example of a storage array. The storage array 100 may be a storage array at a primary site, at a secondary site or other location and may serve as production storage, replication storage, backup storage, disaster recovery storage, or the like. The storage array 100 may be implemented or deployed in a local network, a datacenter, or in a cloud environment.

FIG. 1A illustrates that the storage array 100 may include a front end 102, an internal fabric 106, a back end 108, and a disk array 110. The front end 102 may also manage a cache 104. Multiple servers 120 can connect to the storage array 120 through an external fabric 124, which may include network connections. The front end 102 is a gateway to the storage array 100 and is responsible for accepting and handling requests from the servers 120. Thus the front end 102 is configured to interface with external servers, hosts, fabrics, or the like.

The layers of the storage array 100 (e.g., the front end 102, the internal fabric 106, the back end 108) abstract the data placement layout on the disks in the disk array 110. One of the servers 120, for example, may see one volume with block addresses going from 0 to Size-1. However, the data may actually be stored across multiple devices or disks in the disk array 110. This complexity is hidden by these layers of the storage array 100. Storing the data in this manner across multiple devices improves parallelism for performance, adds redundancy, improves thin provisioning, and allows devices exposed to the servers to be of different sizes and topologies than the actual disks in the disk array 110. This arrangement also facilitates space management.

For example, the front end 102 may pass or forward a request to the back end 108 (e.g., through an internal fabric 106, which may include switches, or perform function calls, message passing, or the like). The back end 108 is responsible for interacting with the disks in the disk array 110 to access (e.g., read or write) data. Thus, the back end 108 may write and/or retrieve data responsive to the requests or other accesses passing through or involving one or more of the various layers (e.g., front end 102, internal fabric 106, cache 104) of the storage array 100. The back end 108 communicates with disks controlled by or included in the storage array 100. Within the array 110, these communications may be direct or through the internal fabric 106.

More specifically, FIG. 1A illustrates that an IO (Input/Output) to or from the disk array 110 may pass through many layers. This arrangement often works well for local reads and writes but is not optimum for reading/writing larger chunks of data including consecutive data.

Embodiments of the invention allow a device or application (e.g., the server 122) to access the disk array 110. In one example, the disk array 110 may be a disk array that is configured to sit directly on the internal fabric 106. The storage array 100 may be configured such that the disk array 110 provides direct access to external entities. In one example, the internal fabric 106 may be opened to an external entity such as the server 122. Direct access to the disks in the disk array 110 allows data to be accessed without passing through other layers of the storage array 100.

In one example, the disk array 110 (e.g., a fabric Disk Array Enclosure or fDAE) sits on the internal fabric 106 and the disk array 110 is configured for direct access through the internal fabric 106 or directly to the disk array 110 (e.g., the fDAE may have an internal interface or card). The disk array 110 allows the enclosed disks to be accessed directly while avoiding other layers of the storage array 100. In addition, because the disk array 110 sits on the internal fabric 106, any entity inside the storage array 100 can access the disk array 100 or the disks therein directly. Embodiments of the invention open the internal fabric 106 to an external host (e.g., trusted hosts or servers or machines).

In one example, the disk array 110 is a fabric Disk Array Enclosure (fDAE) as previously stated. The drives or disks included in the disk array 110 may be NVMe (Non-Volatile Memory express) drives in one example. In one example, the disk array 110 (and/or the internal fabric 106) may be connected to or exposed to an external fabric, which allows the disk array 110 to be accessed directly without interacting or passing through the front end 102, the back end 108 or the internal fabric 106 in some examples. The disk array 110 and/or the internal fabric 106 can be configured such that the enclosed drives can be accessed by multiple servers or initiators.

An example of the storage array 100 includes architectures by Dell-EMC that employ fDAE. The enclosure may enclose multiple NVMe drives. In one example, the front end, the internal fabric, and the back end are embodied as an array controller that controls access to the storage array.

Figure 1B:
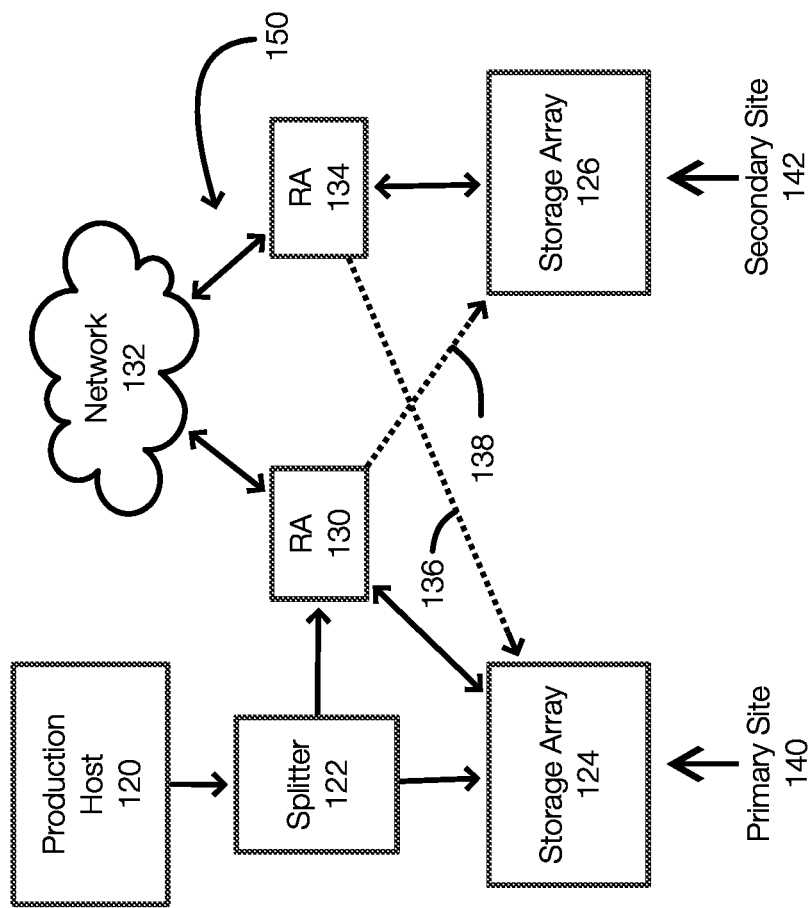
FIG. 1B discloses aspects of a data protection system configured to perform data recovery operations including operations that involve large data transfers using direct disk access.

FIG. 1B illustrates an example of a computing system or environment that includes a data protection system. FIG. 1B also illustrates the operation of the data protection system 150. An example data protection system is RecoverPoint by Dell EMC.

In this example, the computing environment includes a production site 140 and a secondary site 142. The primary site 140 may be a production site that is used during ongoing or active operation. The secondary site 142 may be a replica site, a backup site, or the like. Production data is typical backed up to or replicated to the secondary site 142. Thus, the production host 120 may perform IO with respect to a storage array 124. A splitter 122 (which may be part of a data protection system 150) may cooperate with an RA 130 (an example of which is DELL EMC RecoverPoint Appliance). to replicate the IOs to an RA 134, which stores the data in a storage array 126.

The storage array 124 and the storage array 126 may be cloud based, in the same cloud, in different clouds, or in different computing configurations.

Embodiments of the invention may include situations where large data transfers are required. From this perspective, the primary site 140 may be a source and the secondary site may be a target when performing a full sweep of the production data or the like. However, the secondary site may be the source and the production site may be the target when, for example, restoring data from a backup or replica copy. The storage array may be on-premise in a company, in a hosted datacenter, in the same datacenter or different datacenters, or the cloud in general.

The data protection system 150 generally operates as follows. A production host 120 may operate at a production site. As the production host 120 accesses (e.g., read/write IOs) the storage array 124, the splitter 122 may intercept writes and send a copy of the writes to the RA 130. The RA 130 then sends the replicated data over the network 132 to the RA 134, which writes the data to the storage array 126. In this manner, the storage array 124 can be replicated. The storage array 126 can store a replica copy of the data at the storage array 124. The storage array 126 (or the data stored there) can be used for recovery, disaster recover, failover, or the like.

FIG. 1B illustrates an example of performing data protection operations that involve large data transfers. When large data transfers are involved, a large amount of data is read from a source site and transferred to a target site. Some examples include an initial full sweep of a source disk, a long synchronization, a full sweep to restore, and the like. For purposes of data transfer either of the storage array 124 and the storage array 126 can be the source and the other can be the target.

For example, if the storage array 124 fails, a full restore may be necessary. In a full restore, a large amount of data is transferred from the storage array 126 to the storage array 124. In another example, a full sweep may include the process of copying the data at the storage array 124 to the storage array 126 or sending all data of a local disk to a remote site. A long synchronization may occur when there is substantial data loss. A long synchronization may also occur when initializing data protection for the first time. The replica volume needs to start off by being identical to the production volume such that differentials may be sent later.

Some data transfers between the RA 130 and the RA 134 may involve the following steps:
Read data from the source;
Send the data over TCP (Transmission Control Protocol) using the network 132; and
Write the data to the target.

More specifically, when data is transferred using TCP, the data flows from the disks, through the storage array 126 (including the back end, the internal fabric, and the front end) to the RA 134. The data is then transferred over the network 132 to the RA 130 using TCP. The RA 130 then writes the data to the storage array through the same layers including the front end, the internal fabric, and the back end.

These layers (the front end, the internal fabric, and the back end, for example) can result in unnecessary resource consumption in the RA 130, the RA 134, and the network 132. This process adds latency and may be subject to data loss. The latency introduced by this process may complicate large data transfers even if still possible.

For large data transfers, the data protection system 150 may adapt the transfer process as follows. Consider an example where data is recovered from the storage array 126 to the storage array 124. In this example, the RA 134 communicates with the storage array 126 to identify the locations of the data to be transferred. As previously stated, the abstraction of the storage array allows the storage array to appear, for example, as a volume even though the actual data may be distributed among multiple devices. For large data transfers (e.g., when transferring an entire volume or set of volumes), the locations need to be determined because of the abstraction. These locations may be disk addresses for example. This communication may occur through the various layers of the storage array as previously described.

With regard to the locations, the layers of the storage array are built to abstract the volume layout from the physical layout on the disks as previously described. For example, a 1 GB volume may be placed as 1000×1 MB allocation chunks on the physical disks, and these chunks may be across 50 physical devices, in no particular order. To access the volume, a map is needed that states: address 0 of the volume is mapped to 1 MB strip in disk 33 starting at location 100456; Address 1 MB of the volume is mapped to a 5 MB strip in disk 2 starting at location 1234; and so on. Thus the location representation needs to map every volume location to a physical location on the disks. This can be done naively by having a table with an entry for every volume block with a corresponding address in the backend: e.g. 0→33,100456 1→33,100457 2→33,100458 etc. A more concise representation is a scatter-gather list (SGL) which is 0-1 MB→33,100456, 1 MB-6 MB→2,1234, etc. Because data in the disk array is usually allocated as chunks (1 MB chunks in this example) it is more efficient to give the chunk addresses. Thus, by way of example and not limitation, one result is to identify addresses plus lengths (not just the addresses).

The locations are returned, by way of example only, in a scatter gather list (SGL) or other structure, which may be list of tuples that each include a location and a length. The SGL is then sent to the RA 130. The RA 130, after receiving the SGL, accesses the disks of the storage array 126 directly using a communication line 138. This allows the RA 130 to access the data identified in the SGL directly from the disk and avoids the latencies associated with accessing the disks through the layers of the storage array 126. Similarly, the RA 134 may communicate directly with the disks of the storage array 124 using a similar communication line 136. If necessary, similar communication lines allows the RA 134 to communicate with the disk array of the storage array 126 and allows the RA 130 to communicate with the disk array of the storage array 124.

Figure 2:
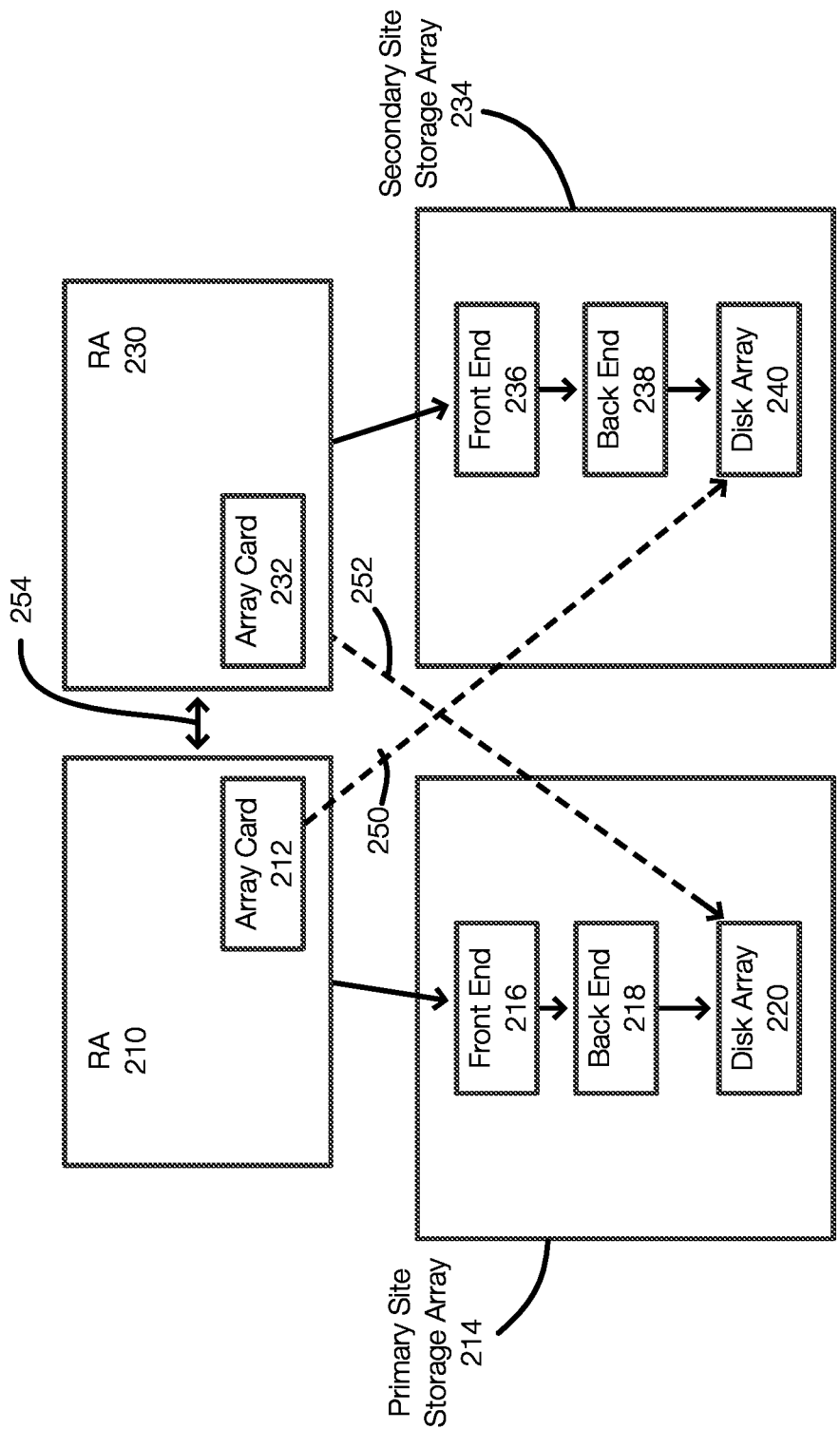
FIG. 2 illustrates another example of a data protection system configured for performing data protection operations using at least two different communication paths.

FIG. 2 illustrates the data protection system of FIG. 1 in more detail. FIG. 2 illustrates an RA 210 associated with a primary site and an RA 230 associated with a replica site. The RA 210 coordinates with the RA 230 to perform data protection operations for data of the primary site including backup, replication, recovery, data transfer, or the like.

In this example, the RA 210 includes an array card 212 and the RA 230 includes an array card 232. When the disk array 220 includes, by way of example only, NVMe disks, the array cards 212 and 232 may be NVMe cards (the disk arrays 220 and 240 may be similarly equipped with cards that allow for direct connection without communicating through the layers of the storage arrays). The disk array 220 and the disk array 240 may be fDAE units that are configured to directly connect the disk array (e.g., the DAE or NVMe disks) to an external fabric. This allows the RA 210 to connect directly to the disk array 240 and avoid processing and latencies associated with the front end 236 and the back end 238. Similarly, the array card 232 allows the RA 230 to avoid the front end 216 and the back end 218 of the storage array 214 and communicate directly the access unit 222 of the disk array 220. The fDAE may also include an internal fabric that is internal to the disk array itself and may be distinct from an internal fabric of the storage array itself.

In one example, the communication lines 250 and 252 may involve communication standards such as, but not limited to, NVMe over Fabric, Infiniband, ethernet, FC, or the like. In one example, the communication standard of the connection 254 may involve TCP or other suitable communication standards.

In another example when recovering or transferring data from the disk array 240 to the disk array 220, the RA 230 may read the disk array 240 and then write to the disk array 220 by directly connecting to the disk array 220 (or directly to the internal fabric of the storage array, on which the disk array 220 sits). Thus, when the source is the disk array 240 and the target is the disk array 220, the RA 210 may not be involved in the transfer. Further, the front end 216 and the back end 218 are avoided. Similarly, when the source is the disk array 220 and the target is the disk array 240, the data transfer can be accomplished by the RA 210, which reads the disk array 220 by directly connecting to the disk array 220 or the fabric upon which the disk array 220 sits and writes the read data to the disk array 240 by directly connecting to the disk array 240.

In one example, the storage arrays may be associated with a flag such as a do not cache flag. This allows or prevents the cache on the disk driver itself from being used during these types of situations. For large data transfers, data is not typically read more than once. Rather, the data or blocks are read only once in some embodiments. As a result, bypassing the cache can improve performance of these types of operations. More specifically, bypassing the cache improves the operations of the storage array. Large data transfers may fill the cache with data that has a very low probability of being accessed again in the near term. As a result, there is little utility in caching the data. Cache resources are limited and inserting the data subject to the large data transfer is at the expense of other data already present in the cache or that may be placed in the cache. In other words, the large data transfers discussed herein do not benefit from being placed in the cache and may actually cause useful data in the cache to be evicted. The evicted data may have been used by other volumes that were benefiting from the cache.

Figure 3:
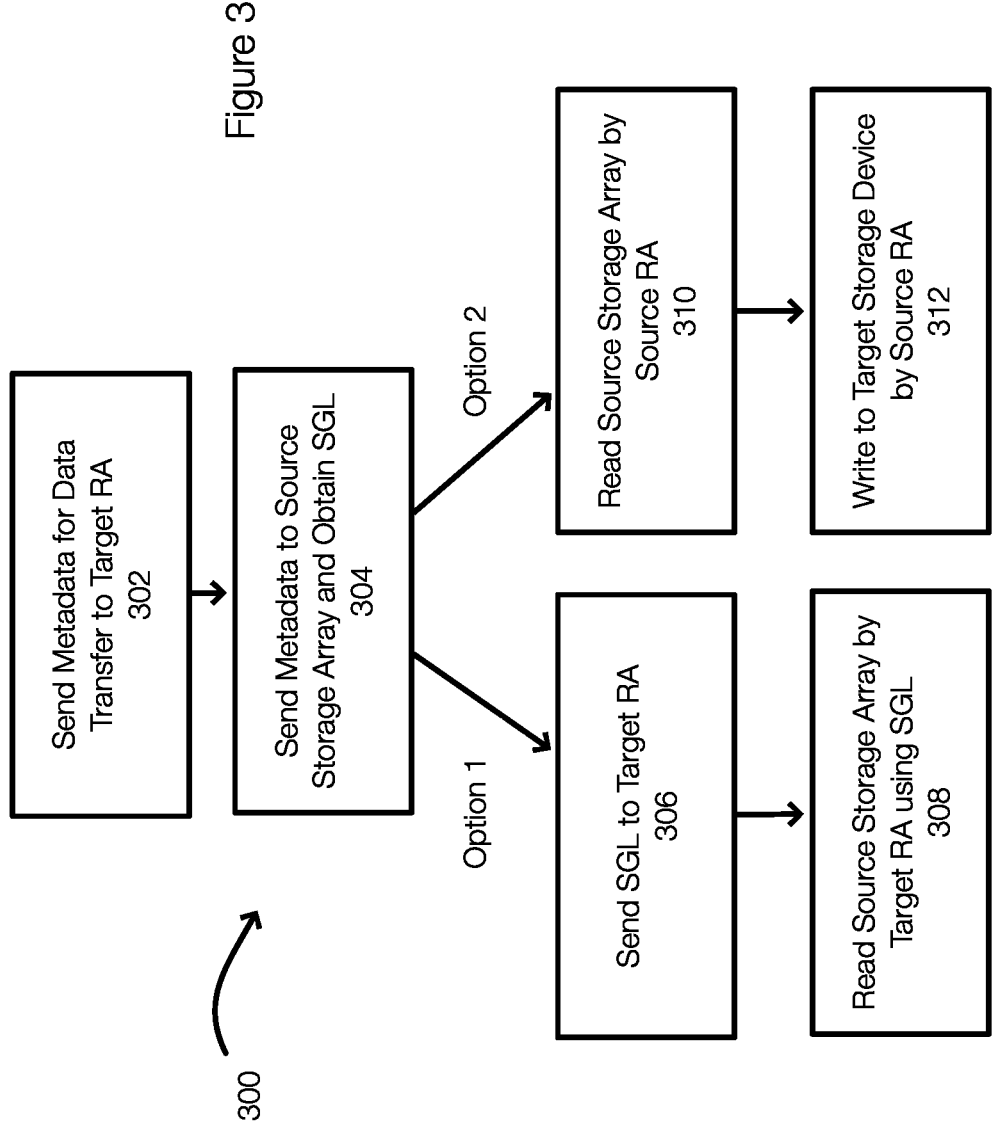
FIG. 3 illustrates an example of a method for performing a data protection operation including an operation that involves large data transfer.

FIG. 3 illustrates an example of a method for protecting data. More specifically FIG. 3 illustrates an example of a method 300 for performing a data protection operation such as a recovery operation, a full sweep operation, a partial sync operation, or the like. In one example, the data protection operation is associated with a large data transfer.

When a need to perform a data protection operation is identified (e.g., loss of data, disaster, disk/array failure), the method may begin by sending 302 metadata for the data transfer operation (which may be part of a larger recovery operation, full sweep operation, or partial sync operation, by way of example). FIG. 3 references a source and a target. By way of example only, the source may be one of primary (e.g., production) data or secondary (e.g., backup, replication, etc.) data and the target is the other. Thus, a recovery operation typically recovers from the secondary site to the primary site (e.g., reads from the secondary storage array and writes to the primary storage array). A full sweep or partial synch may be performed in the other direction from the primary site to the secondary site.

In this example, the source RA knows which blocks of data need to be transferred and metadata is sent to the target RA. The metadata may also be sent to the source storage array in order to obtain 304, from the source storage array, an SGL that identifies the locations and lengths of the data to be transferred. Examples of the metadata may include, by way of example only, what volume needs to be transferred, access data, credentials, encryption keys compression types, modes of operations, compatibility, interoperability information, and the like or combination thereof. Some of this metadata may be per volume, per array, and may be derived per volume. In one embodiment, there may only be a section of the volume to transfer (not the full volume). This requires designating what subset of the volume need to be transferred. The SGL maps the areas required to transfer the actual data chunks.

The operation has a couple of options at this stage. Both options include transferring the data using a different path from the communication path between the source RA and the target RA. In a first option, the SGL is sent 306, by the source RA, to the target RA. The target RA then reads 308 the source storage array directly using the SGL to read the data. The data read from the source storage can be written directly to the target storage array or using the layers of the storage array.

In a second option, the source storage array is read 310 directly (bypassing the layers as previously described), using the SGL. The source RA can then write 312 the data directly to the target storage array. In these embodiments, the data transfer occurs over a transport that allows for higher transport speeds.

In one example, in order to accommodate larger distances, RA appliances could be concatenated based in part, on maximum distance limitations. This allows for rapid transfer of data over large distances.

Embodiments of the invention thus optimize large data transfers for various operations including recovery, synchronization, replication, and the like using direct disk array access (e.g., fDAE access in one example). The process includes obtaining volume mappings and using them to write directly to the fDAE, by passing abstraction layers such as the back end, various fabrics, and the front end of a storage array. Embodiments of the invention can improve or shorten the recovery time objective (RTO) and conserve computing resources including CPU and network resources. By reducing data transfer time, the recovery time is shorter and results in an improved RTO.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. More generally, the scope of the invention embraces any operating environment in which the disclosed concepts may be useful.

At least some embodiments of the invention provide for the implementation of the disclosed functionality in existing backup platforms, examples of which include the Dell-EMC RecoverPoint Appliances, NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method for performing a data protection operation, comprising: identifying data to transfer from a source storage array associated with a source appliance to a target storage array associated with a target appliance, obtaining a list of identifiers for the identified data by the source appliance, wherein the list of identifiers includes at least locations of the data to be transferred, wherein the list of identifiers is transferred over a first communication path, and transferring the data corresponding to the list of identifiers to the target storage array using a second communication path that is different from the first communication path.

Embodiment 2. The method of embodiment 1, wherein the list of identifiers comprises a scatter gather list, further comprising sending the scatter gather list to the target appliance.

Embodiment 3. The method of embodiment 1 and/or 2, further comprising, reading data from the source storage array, by the target appliance based on the scatter gather list, over the second communication path.

Embodiment 4. The method of embodiment 1, 2, and/or 3, further comprising writing, by the target appliance, the data read from the source storage array to the target storage array.

Embodiment 5. The method of embodiment 1, 2, 3, and/or 4, further comprising reading data from the source storage array by the source appliance based on the list of identifiers, wherein the list of identifiers comprises a scatter gather list.

Embodiment 6. The method of embodiment 1, 2, 3, 4, and/or 5, further comprising writing the data read from the source storage array to the target storage array, by the source appliance, over the second communication path.

Embodiment 7. The method of embodiment 1, 2, 3, 4, 5, and/or 6, further comprising setting a do not cache flag for the source storage array.

Embodiment 8. The method of embodiment 1, 2, 3, 4, 5, 6, and/or 7, wherein the data protection operation is one of a recovery operation, a full sweep operation, or a partial synchronization.

Embodiment 9. The method of embodiment 1, 2, 3, 4, 5, 6, 7, and/or 8, further comprising transferring the data corresponding to the list of identifiers without passing the data through layers of the source storage array or through layers of the target storage array, the layers including a front end, a back end, and an internal fabric.

Embodiment 10. The method of embodiment 1, 2, 3, 4, 5, 6, 7, 8, and/or 9, further comprising reading the data associated with the list of identifiers a single time without caching the read data in a cache associated with a disk array of the source storage array.

Embodiment 11. The method as recited in any of embodiments 1 to 10 or portions thereof.

Embodiment 12: A non-transitory storage medium having stored therein instructions that are executable by one or more hardware processors to perform the operations of any one or more of embodiments or portions thereof of embodiments 1 to 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In some examples, a physical computing device include a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a data transfer operation, comprising:
  accessing, by a source appliance, metadata associated with data stored in a source storage array through a front end of the source storage array, wherein the metadata includes a list of identifiers that identifies physical locations of data in the source storage array to be transferred to a target storage array, wherein the target storage array includes a front end;
  transferring the metadata to a target appliance using a first communication path, wherein the first communication path includes accessing a disk array of the source storage array through the front end of the source storage array, wherein access to the data stored in the disk array of the source storage array through the front end is abstracted using one or more layers; and
  determining a second communication path for transferring the data identified in the list of identifiers from the source storage array to the target storage array, wherein the second communication path uses physical locations of the data and is one of:
    the source appliance (i) reading the data using the list of identifiers directly from the disk array of the source storage array without using the front end of the source storage array and (ii) writing the data directly to a disk array of the target storage array without using the front end of the target storage array;
    or the target appliance (i) reading the data using the list of identifiers directly from the disk array of the source storage array without using the front end of the source storage array and (ii) writing the data to the disk array of the target storage array directly or via the front end of the target storage array.

2. The method of claim 1, further comprising accessing the data stored in the source storage array, by the source appliance, using the list of identifiers.

3. The method of claim 1, wherein the list of identifiers comprises a scatter gather list.

4. The method of claim 1, further comprising accessing the data stored in the source storage array, by the target appliance, using the list of identifiers, wherein the second communication path includes from the disk array of the source storage array to the target appliance.

5. The method of claim 1, wherein the data protection operation is performed without caching the data.

6. The method of claim 1, further comprising reading the data associated with the list of identifiers a single time without caching the read data in a cache associated with a disk array of the source storage array.

7. A non-transitory storage medium having stored therein instructions that are executable be one or more hardware processors to perform operations comprising:
  accessing, by a source appliance, metadata associated with data stored in a source storage array through a front end of the source storage array, wherein the metadata includes a list of identifiers that identifies physical locations of data in the source storage array to be transferred to a target storage array, wherein the target storage array includes a front end;
  transferring the metadata to a target appliance using a first communication path, wherein the first communication path includes accessing a disk array of the source storage array through the front end of the source storage array, wherein access to the data stored in the disk array of the source storage array through the front end is abstracted using one or more layers; and
  determining a second communication path for transferring the data identified in the list of identifiers from the source storage array to the target storage array, wherein the second communication path uses physical locations of the data and is one of:
    the source appliance (i) reading the data using the list of identifiers directly from the disk array of the source storage array without using the front end of the source storage array and (ii) writing the data directly to a disk array of the target storage array without using the front end of the target storage array;
    or the target appliance (i) reading the data using the list of identifiers directly from the disk array of the source storage array without using the front end of the source storage array and (ii) writing the data to the disk array of the target storage array directly or via the front end of the target storage array.

8. The non-transitory storage medium of claim 7, further comprising accessing the data stored in the source storage array, by the source appliance, using the list of identifiers.

9. The non-transitory storage medium of claim 7, wherein the list of identifiers comprises a scatter gather list.

10. The non-transitory storage medium of claim 7, further comprising accessing the data stored in the source storage array, by the target appliance, using the list of identifiers, wherein the second communication path includes from the disk array of the source storage array to the target appliance.

11. The non-transitory storage medium of claim 7, wherein the data protection operation is performed without caching the data.

12. The non-transitory storage medium of claim 7, further comprising reading the data associated with the list of identifiers a single time without caching the read data in a cache associated with a disk array of the source storage array.

* * * * *